(12) United States Patent
Kunjuraman Pillai et al.

(10) Patent No.: US 12,034,715 B2
(45) Date of Patent: *Jul. 9, 2024

(54) SYSTEM AND METHOD FOR CLOUD-BASED ANALYTICS

(71) Applicant: Capital One Services, LLC, McLean, VA (US)

(72) Inventors: Anoop Kunjuraman Pillai, Plano, TX (US); Jonathan Lee, Frisco, TX (US); Venu Gopal Rao Meda, Plano, TX (US); Dan Tresnak, Frisco, TX (US); Raveender Kommera, Flower Mound, TX (US); Michael Carrillo, Frisco, TX (US); Leonardo Gomide, Addison, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,042

(22) Filed: May 12, 2023

(65) Prior Publication Data

US 2023/0283601 A1 Sep. 7, 2023

Related U.S. Application Data

(63) Continuation of application No. 17/355,071, filed on Jun. 22, 2021, now Pat. No. 11,711,354, which is a
(Continued)

(51) Int. Cl.
*H04L 9/40* (2022.01)
*G06F 21/41* (2013.01)
(Continued)

(52) U.S. Cl.
CPC .......... *H04L 63/0815* (2013.01); *G06F 21/41* (2013.01); *G06F 21/6218* (2013.01);
(Continued)

(58) Field of Classification Search
CPC ............... H04L 63/0815; H04L 63/083; H04L 63/0861; H04L 67/01; H04L 67/1097;
(Continued)

(56) References Cited

U.S. PATENT DOCUMENTS 7,035,907 B1 * 4/2006 Decasper ............ H04L 67/5651 709/212
7,716,186 B2 5/2010 Cannon et al.
(Continued)

OTHER PUBLICATIONS

Office Action in related Canadian Patent Application No. CA 3,016,190, dated Oct. 31, 2023.
(Continued)

*Primary Examiner* — Aravind K Moorthy
(74) *Attorney, Agent, or Firm* — TROUTMAN PEPPER HAMILTON SANDERS LLP; Christopher J. Forstner; John A. Morrissett

(57) ABSTRACT

A system and method in accordance with example embodiments may include systems and methods for a cloud-based analytics platform. The cloud-based analytics platform may allow the manual and automatic uploading to and/or downloading from a cloud server. The platform may include single sign-on (SSO) capabilities such that a user may have one set of credentials to access data from the cloud-based analytics and/or data stored locally. The platform may include data validation and processing in order to provide real-time feedback on uploads based on file type, file size, access rights, extracted data, and transformed data.

19 Claims, 3 Drawing Sheets

Related U.S. Application Data continuation of application No. 16/858,483, filed on Apr. 24, 2020, now Pat. No. 11,082,419, which is a continuation of application No. 15/690,853, filed on Aug. 30, 2017, now Pat. No. 10,637,846.

(51) Int. Cl.
| | |
|---|---|
| G06F 21/62 | (2013.01) |
| H04L 67/00 | (2022.01) |
| H04L 67/01 | (2022.01) |
| H04L 67/1008 | (2022.01) |
| H04L 67/1017 | (2022.01) |
| H04L 67/1019 | (2022.01) |
| H04L 67/1097 | (2022.01) |
| H04L 67/12 | (2022.01) |
| H04L 67/303 | (2022.01) |

(52) U.S. Cl.
CPC ........ *H04L 63/083* (2013.01); *H04L 63/0861* (2013.01); *H04L 67/01* (2022.05); *H04L 67/1097* (2013.01); *H04L 67/303* (2013.01); *H04L 67/34* (2013.01); *H04L 67/1008* (2013.01); *H04L 67/1017* (2013.01); *H04L 67/1019* (2013.01); *H04L 67/12* (2013.01)

(58) Field of Classification Search
CPC ... H04L 67/303; H04L 67/34; H04L 67/1008; H04L 67/1017; H04L 67/1019; H04L 67/12; G06F 21/41; G06F 21/6218
See application file for complete search history.

(56) References Cited

U.S. PATENT DOCUMENTS

| | | | |
|---|---|---|---|
| 8,229,946 B1 | 7/2012 | Crane | |
| 8,370,648 B1 | 2/2013 | Natanzon | |
| 9,137,304 B2 | 9/2015 | Novotny | |
| 9,268,652 B1 | 2/2016 | Salyers et al. | |
| 9,450,945 B1 | 9/2016 | Koeten et al. | |
| 9,609,025 B1 | 3/2017 | Betzler et al. | |
| 9,635,307 B1 | 4/2017 | Mysore et al. | |
| 9,679,040 B1 | 6/2017 | Davis et al. | |
| 9,705,972 B2 | 7/2017 | Aaron et al. | |
| 9,805,075 B1 | 10/2017 | Bachu | |
| 9,990,365 B1 | 6/2018 | Kilpatrick et al. | |
| 10,089,187 B1 | 10/2018 | Pecoraro et al. | |
| 10,091,290 B1* | 10/2018 | Hansen | H04L 67/1097 |
| 10,133,759 B1 | 11/2018 | Abuomar | |
| 10,554,750 B2 | 2/2020 | Vasyutynskyy | |
| 10,637,846 B2* | 4/2020 | Kunjaraman Pillai | H04L 67/303 |
| 10,645,120 B2 | 5/2020 | Summers et al. | |
| 11,082,419 B2* | 8/2021 | Kunjuraman Pillai | H04L 67/1097 |
| 11,711,354 B2* | 7/2023 | Kunjuraman Pillai | H04L 67/01 726/7 |
| 2003/0232616 A1 | 12/2003 | Gidron et al. | |
| 2005/0022012 A1* | 1/2005 | Bluestone | H04L 12/2876 726/4 |
| 2005/0075116 A1 | 4/2005 | Laird et al. | |
| 2005/0114339 A1* | 5/2005 | Challener | G06F 16/252 |
| 2006/0236033 A1 | 10/2006 | Guinn et al. | |
| 2007/0078928 A1* | 4/2007 | Yang | H04L 67/62 709/203 |
| 2008/0005780 A1 | 1/2008 | Singleton | |
| 2008/0183794 A1* | 7/2008 | Georgis | H04L 67/1074 709/201 |
| 2009/0222596 A1 | 9/2009 | Flynn et al. | |
| 2009/0292930 A1 | 11/2009 | Marano et al. | |
| 2010/0027552 A1 | 2/2010 | Hill et al. | |
| 2010/0037088 A1 | 2/2010 | Krivopaltsev et al. | |
| 2010/0153482 A1 | 6/2010 | Kim et al. | |
| 2010/0180034 A1 | 7/2010 | Weiner et al. | |
| 2010/0235891 A1 | 9/2010 | Oglesbee et al. | |
| 2010/0332401 A1 | 12/2010 | Prahlad et al. | |
| 2011/0277013 A1 | 11/2011 | Chinta | |
| 2011/0302640 A1 | 12/2011 | Liu et al. | |
| 2012/0030187 A1 | 2/2012 | Marano | |
| 2012/0054318 A1* | 3/2012 | Kim | H04L 67/025 709/219 |
| 2013/0006980 A1 | 1/2013 | Frumin | |
| 2013/0054535 A1* | 2/2013 | Ledoux | G06F 8/61 707/827 |
| 2013/0073621 A1 | 3/2013 | Waddoups et al. | |
| 2013/0086603 A1* | 4/2013 | Kruger | G06F 16/9535 725/14 |
| 2013/0218940 A1* | 8/2013 | Shannon | H04L 63/30 709/201 |
| 2013/0219176 A1 | 8/2013 | Akella et al. | |
| 2013/0227431 A1 | 8/2013 | Vasudevan et al. | |
| 2013/0298037 A1 | 11/2013 | Matthews et al. | |
| 2014/0082124 A1* | 3/2014 | van Coppenolle | H04L 67/563 709/213 |
| 2014/0082125 A1* | 3/2014 | van Coppenolle | H04N 21/84 709/213 |
| 2014/0101223 A1 | 4/2014 | Cosham et al. | |
| 2014/0188256 A1 | 7/2014 | Liu | |
| 2014/0201218 A1 | 7/2014 | Catalano et al. | |
| 2014/0289513 A1 | 9/2014 | Huang et al. | |
| 2014/0380040 A1* | 12/2014 | Albahdal | H04L 9/0894 713/155 |
| 2015/0012639 A1 | 1/2015 | McLean | |
| 2015/0143485 A1* | 5/2015 | Tamura | H04L 63/08 726/6 |
| 2015/0149211 A1 | 5/2015 | Ohad et al. | |
| 2015/0154418 A1 | 6/2015 | Redberg | |
| 2015/0156281 A1 | 6/2015 | Krieger et al. | |
| 2015/0160996 A1 | 6/2015 | Liu | |
| 2015/0196920 A1 | 7/2015 | Celli et al. | |
| 2015/0201399 A1 | 7/2015 | Yeh | |
| 2015/0205979 A1 | 7/2015 | Dong et al. | |
| 2015/0290808 A1 | 10/2015 | Renkis | |
| 2015/0331905 A1 | 11/2015 | Brand | |
| 2015/0356124 A1 | 12/2015 | Chauvet et al. | |
| 2015/0365275 A1 | 12/2015 | Iliev et al. | |
| 2015/0372997 A1 | 12/2015 | Lokamathe et al. | |
| 2016/0026718 A1 | 1/2016 | Hopkins et al. | |
| 2016/0028806 A1 | 1/2016 | Wareing | |
| 2016/0055347 A1 | 2/2016 | Park et al. | |
| 2016/0057027 A1 | 2/2016 | Hinrichs et al. | |
| 2016/0078139 A1 | 3/2016 | Clinton et al. | |
| 2016/0087793 A1 | 3/2016 | Karame et al. | |
| 2016/0094585 A1 | 3/2016 | Shahbazian et al. | |
| 2016/0110254 A1 | 4/2016 | Cronie | |
| 2016/0134755 A1 | 5/2016 | Carlson et al. | |
| 2016/0142913 A1 | 5/2016 | Ghosh et al. | |
| 2016/0234303 A1 | 8/2016 | Liu et al. | |
| 2016/0254968 A1 | 9/2016 | Ebtekar et al. | |
| 2016/0259937 A1 | 9/2016 | Ford et al. | |
| 2016/0269371 A1 | 9/2016 | Coimbatore | |
| 2016/0277368 A1 | 9/2016 | Narayanaswamy et al. | |
| 2016/0302214 A1* | 10/2016 | Yun | H04L 67/56 |
| 2016/0381593 A1 | 12/2016 | Hao et al. | |
| 2017/0055247 A1 | 2/2017 | Yu et al. | |
| 2017/0060629 A1 | 3/2017 | Vora et al. | |
| 2017/0070506 A1 | 3/2017 | Reddy et al. | |
| 2017/0083306 A1* | 3/2017 | Lincoln | H04L 67/34 |
| 2017/0093867 A1 | 3/2017 | Burns et al. | |
| 2017/0094515 A1 | 3/2017 | Salo et al. | |
| 2017/0099344 A1 | 4/2017 | Hadfield et al. | |
| 2017/0104762 A1 | 4/2017 | Feng | |
| 2017/0132429 A1 | 5/2017 | Bell et al. | |
| 2017/0134961 A1 | 5/2017 | Ghosh et al. | |
| 2017/0163716 A1 | 6/2017 | Jang et al. | |
| 2017/0163752 A1 | 6/2017 | Kaledhonkar et al. | |
| 2017/0171231 A1* | 6/2017 | Reybok, Jr. | H04L 63/02 |
| 2017/0206218 A1 | 7/2017 | Jai et al. | |
| 2017/0208052 A1 | 7/2017 | Jai et al. | |
| 2017/0208125 A1 | 7/2017 | Jai et al. | |
| 2017/0235965 A1 | 8/2017 | Balinsky et al. | |

(56) References Cited

U.S. PATENT DOCUMENTS

| | | |
|---|---|---|
| 2017/0290058 A1 | 10/2017 | Singh et al. |
| 2017/0323111 A1 | 11/2017 | Hernandez Gonzalez et al. |
| 2017/0357492 A1 | 12/2017 | Adler et al. |
| 2018/0018217 A1 | 1/2018 | Cordero et al. |
| 2018/0041501 A1* | 2/2018 | Liao .................. B65D 25/00 |
| 2018/0084052 A1* | 3/2018 | Trachy ................ G06F 16/273 |
| 2018/0096497 A1 | 4/2018 | Bennett et al. |
| 2018/0146032 A1 | 5/2018 | Parikh et al. |
| 2018/0210891 A1 | 7/2018 | Oliver et al. |
| 2018/0248882 A1* | 8/2018 | Krauss ................ G06F 9/445 |

OTHER PUBLICATIONS

Extended European Search Report in related EP application No. 18191110.8, dated Jan. 24, 2019.

* cited by examiner

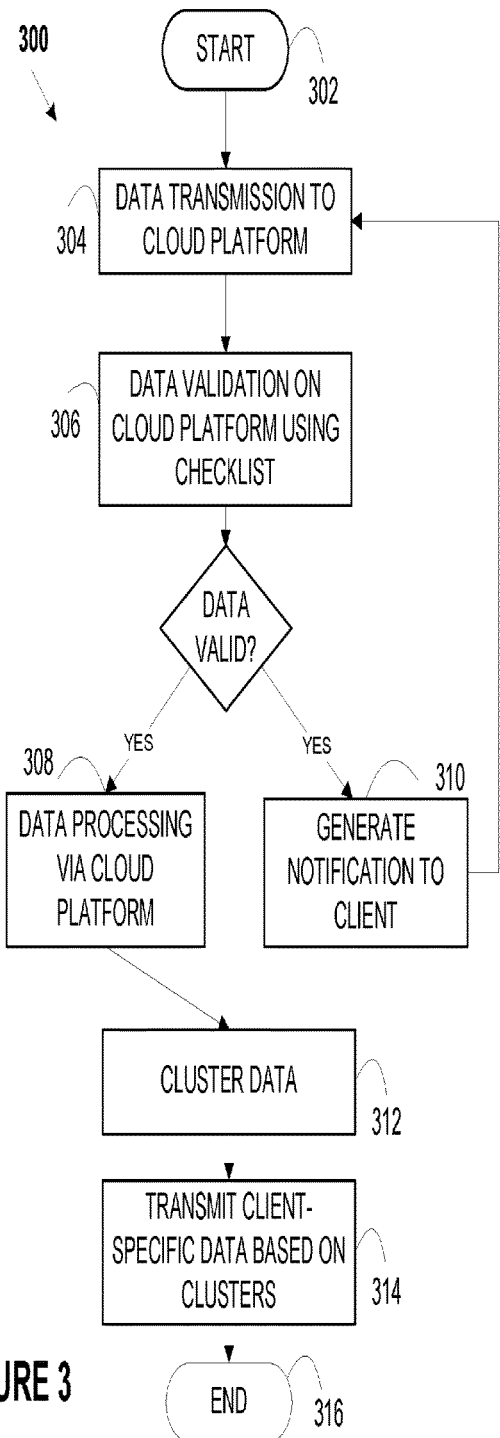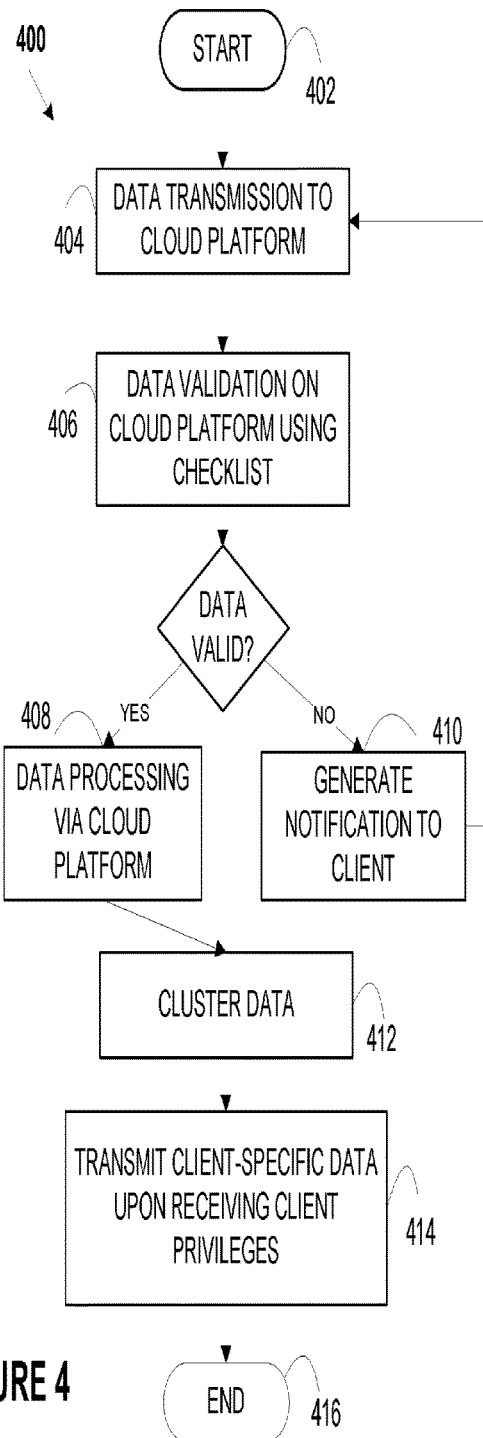
FIGURE 3
FIGURE 4

SYSTEM AND METHOD FOR CLOUD-BASED ANALYTICS

CROSS REFERENCE TO RELATED APPLICATIONS

This application is a continuation of, and claims priority under 35 U.S.C. § 120 to, U.S. patent application Ser. No. 17/355,071, filed Jun. 22, 2021, which is a continuation of U.S. patent application Ser. No. 16/858,483, now U.S. Pat. No. 11,082,419, filed Apr. 24, 2020, which is a continuation of U.S. patent application Ser. No. 15/690,853, now U.S. Pat. No. 10,637,846, filed Aug. 30, 2017, the entire contents of which are fully incorporated herein by reference.

FIELD

The present disclosure relates to systems and methods for a cloud-based analytics platform. The cloud-based analytics platform may allow the manual and automatic uploading to and/or downloading from a cloud server. The platform may include single sign-on (SSO) capabilities such that a user may have one set of credentials to access data from the cloud-based analytics and/or data stored locally. Integration with SSO helps users to login using their organizational username and password. They do not have to maintain a separate login credentials for this individual application. The platform may include data validation and processing in order to provide real-time feedback on uploads based on file type, file size, access rights, extracted data, and transformed data. There is an ability to set up a data schema and configure the rules for data validation. Once data is loaded, there is a process (in the form of a Micro service) that gets a trigger. The process reads the data loaded and does two things—first, it makes sure data conforms to the predefined schema; second, it checks for the preconfigured validation rules to make sure data is within the boundaries. If data is good, then user gets notification of success, otherwise, failure notification.

BACKGROUND

Current business processes for data analytics includes utilizing scripts to run batch processing on data to upload data and retrieve uploaded data. Once batch processing runs, feedback on the data associated with the batch processing may be provided to an end user. The end user may then manually resolve any failures noted in the feedback and a batch process may be executed again as scheduled. Additionally, where a system requires specific user privileges, a user may have to provide specific system privileges in order to retrieve data associated with the batch processing. Moreover, to the extent a user is using a client device and attempting to access files located on a server, the user may be prevented from accessing the server according to server runtime and downtime.

These and other drawbacks exist.

SUMMARY

The example embodiments of the disclosure describe a solution to the above-identified problems that is necessarily rooted in computer technology in order to overcome problems related to data validation, processing, and analytics in a client-server platform using cloud-based technologies, which arise specifically in the realm of computer networks. For example, the example embodiments relate to systems and methods for a cloud-based analytics platform that may allow the manual and automatic uploading to and/or downloading from a cloud server, include single sign-on (SSO) capabilities such that a user may have one set of credentials to access data from the cloud-based analytics and/or data stored locally, and/or include data validation and processing in order to provide real-time feedback on uploads based on file type, file size, access rights, extracted data, and transformed data.

In one example embodiment, the present disclosure is directed to a system for providing cloud-based data validation and/or processing of uploads to be distributed in a client-server system. In an example embodiment, a cloud server system may receive a data transmission from an uploading client device. The data transmission may include a set of data validation rules, or a validation checklist. A set of validation rules, or a validation checklist, may also reside on the cloud server system and the data transmission may include data indicative of specific validation rules to execute for the data transmission. The validation rules are part of the configuration files residing on the cloud. The cloud server system may execute the set of validation rules against the received data. If the validation rules indicate that the received data is invalid, the cloud server system may generate a notification and transmit the notification to the uploading client device to alert the uploading client device of an invalid and unsuccessful data upload in real-time. The uploading client device may then reformat, regenerate, and/or retransmit the data associated with the invalid upload. Once the data is retransmitted to the cloud server, the data validation rules may be re-executed, and this process may continue until valid data is uploaded to the cloud server.

In an example embodiment, once the uploaded data is validated against the validation rules, the data may be processed by the cloud server according to data processing rules. Data validation rules could be as simple as a range of dates, for example, between Jan. 1, 2017 and Dec. 31, 2017, with a date format of MM/DD/YYYY. Alternatively or in addition, data validation rules may include one or more criteria, for example, dollar amounts below $10000, or ages between 25 and 65. On successful validation, data is transmitted to Kafka messaging. A Micro service listens to the Kafka messaging. The Micro service picks up the data and loads into downstream systems. For example, the Micro service subscribing to this data may need it in SQL Server, so that the Micro service may be configured with SQL Server connection information, table information and insert SQL statements. If the data is needed in a text file at a different location, the Micro service could be configured to do that. If the data would need to be emailed, Micro service may be configured to do that. In other words, the message published in Kafka can be subscribed by one or more downstream systems either in real time or batch mode depending on their requirements. In an example embodiment, once uploaded data is validated, it may be clustered based on data type, data size, a data header, a client classification, a cloud server classification, and/or the like. A cloud server may store the validated uploaded data according to a specific cluster. Once data is stored by the cloud server, the data may be transmitted to a downloading client device. Data may be transmitted to a specific downloading client device based on downloading device privileges, downloading device identifiers, downloading device cluster requests, and/or the like.

In an example embodiment, downloading device privileges may be received at the cloud server via user login data (e.g., username and password), such as in the form of a single-sign-on (SSO) login. Compared to separate usernames and passwords, SSO makes it easy for integrating into corporate systems. Many corporations may prefer their employees/contractors to login to all their systems using one username/password combination rather than individual usernames. New system to be adopted by corporations would need SSO integration as a feature as the best adopted practice. Downloading device privileges may be stored in the cloud server such that a downloading client device may, upon an authenticated handshake, have access to specific data clusters based on stored privileges. Downloading identifiers may include, for example, a device identifier, a client identifier, and/or the like. Downloading device cluster requests may include, for example, a request generated from the downloading client device upon connection with the cloud server for specific data clusters.

Downloading client devices may connect with a cloud server upon device activation, user authentication, device processing downtime, user request, cloud server request, and/or the like. Cloud server may request a data connection with a specific downloading client device to transmit specific cluster data. A downloading client device may, in response to the cloud server request, authenticate the cloud server and authorize data transmission between the cloud server and the downloading client device. Downloading client device may, upon receiving cluster data, process the cluster data in order to generate specific data reports and analysis.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which:

FIG. 3 is a flowchart illustrating an example method system associated with a cloud-based analytics, consistent with various embodiments; and FIG. 4 is a flowchart illustrating an example method system associated with a cloud-based analytics, consistent with various embodiments.

DETAILED DESCRIPTION

Figure 1:
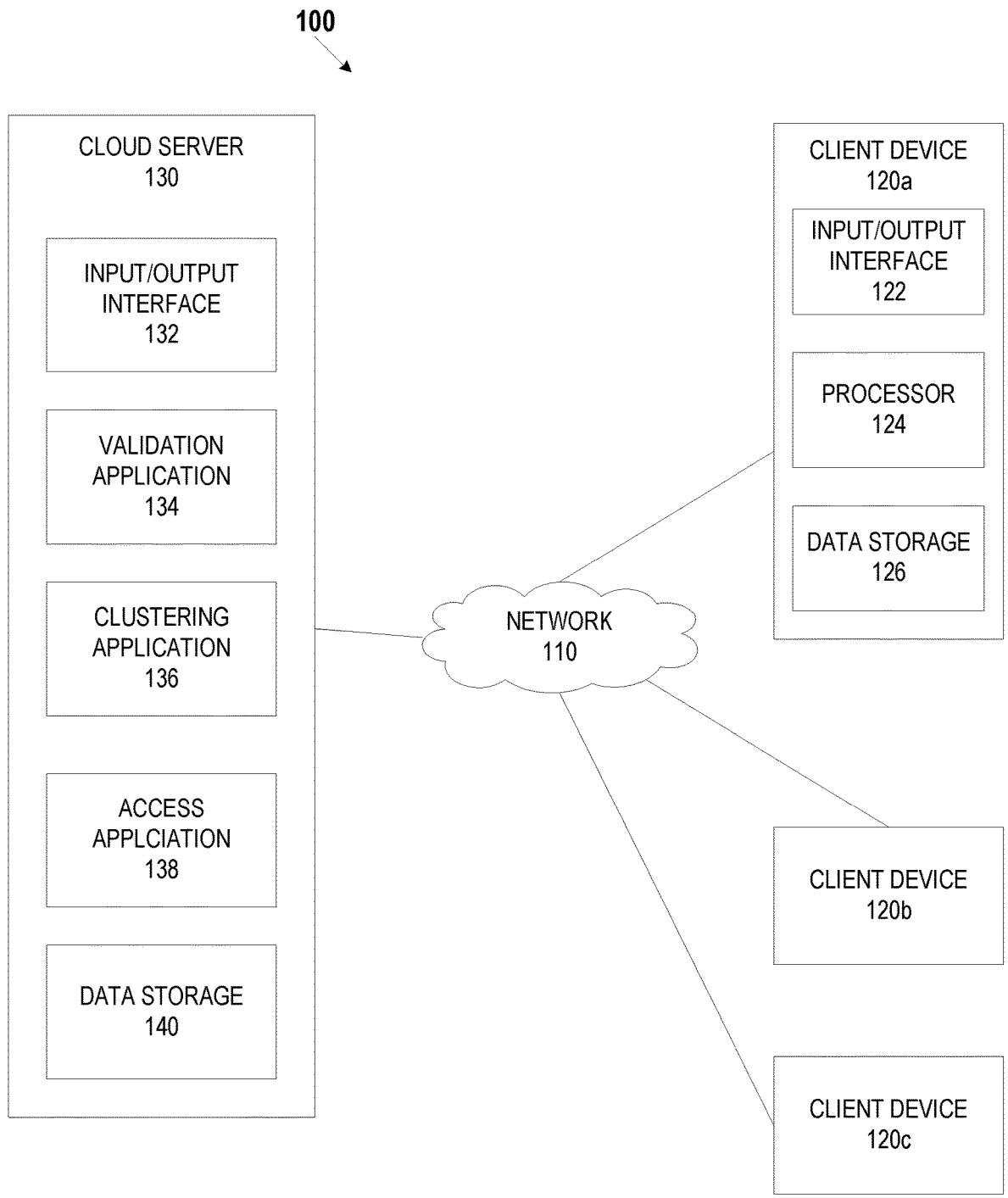
FIG. 1 is a diagram illustrating an example cloud-based analytics platform, consistent with various embodiments.

The following description is intended to convey a thorough understanding of the embodiments described by providing a number of specific example embodiments and details involving systems and methods for providing a cloud-based analytics platform. The cloud-based analytics platform may allow the manual and automatic uploading to and/or downloading from a cloud server using validation and processing rules. The platform may include single sign-on (SSO) capabilities such that a user may have one set of credentials to access data from the cloud-based analytics and/or data stored locally. According to embodiments of the disclosure, "data" can be any data, such as numbers, text, symbols, or the like, or any combination thereof, that can be serialized and represented as a file in a file system. In some embodiments, there are no bounds on the sizes or types of data that can be produced or consumed by users, and it is up to the users to decide the sizes or types of data to be uploaded to or downloaded from the cloud server. The platform data validation rules may provide real-time feedback on uploads based on file type, file size, access rights, extracted data, and transformed data.

The platform processing rules may provide real-time processing such as clustering, categorizing, and/or marking of uploaded data; associated access rights with uploaded data; and/or transforming data. According to embodiments of the disclosure, "clustering" may include tagging data based on metadata or meta-information that is available. For example, a cluster of data may be formed by clustering all data from a particular team. In another example, a cluster of data may be formed by clustering all data uploaded to the cloud server on a particular date. In yet another example, a cluster of data may be formed by clustering all data that include credit card information. Joint or disjoint logical clusters of data may be formed. Joint clusters are clusters that are not mutually exclusive. For example, a set of data may belong to both the cluster that includes all data from a particular team and the cluster that includes all data uploaded on a particular date. In contrast, disjoint clusters are clusters that are mutually exclusive. For example, a first cluster of data uploaded on a particular date is disjoint from a second cluster of data uploaded on a different date. Clustering of data may be based on the types, characteristics, or contents of the data in various manners to facilitate data analytics to be performed by the cloud-based platform.

It should be appreciated, however, that the present disclosure is not limited to these specific embodiments and details, which are example only. It is further understood that one possessing ordinary skill in the art, in light of known systems and methods, would appreciate the use of the invention for its intended purposes and benefits in various embodiments, depending on specific design and other needs. To the extent any specific entity or business group is referenced throughout this disclosure, it is intended that the disclosed system and method be extended to any entity that seeks to use the described cloud platform without departing from the spirit and scope of the disclosure.

According to the various embodiments of the present disclosure, systems and methods are disclosed for providing a cloud-based analytics platform. The systems and methods solve a problem in computer networks—uploading proper data for analytics at an uploading client device and downloading client-specific data at a downloading client. The solutions described herein are necessarily rooted in computer technology to overcome various problems relating to big data uploads, including, for example, validation errors that may occur during batch processing, which may not be discovered until after batch processing has run. The solutions described herein are necessarily rooted in computer technology to overcome various problems relating to client-specific downloads, including, for example, receiving client-specific data at required and necessary times, such as when client device is capable of receiving and processing data. The systems and methods depicted in FIGS. 1 through 4 illustrate a cloud-based analytics platform to solves these, any other, computer-specific problems by providing a cloud-based analytics platform that may allow the manual and automatic uploading to and/or downloading from a cloud server, a single sign-on (SSO) capabilities such that a user may have one set of credentials to access data from the cloud-based analytics and/or data stored locally, data validation and processing rules in order to provide real-time feedback on uploads based on file type, file size, access rights, extracted data, and transformed data, and/or data transmission rules associated with downloading client devices.

In such an embodiment, the system may include one or more cloud servers connected to one or more uploading client devices and one or more downloading client devices where the cloud server may be accessed by any client device to upload and/or download data. The cloud server may include a number of rules and processes to validate uploaded data, process the validated data, provide access to the validated and/or processed data, and store the validated and/or processed data. Data may be stored in Kafka for processing by subscribers. In some implementations, the subscriber may choose to maintain multiple entries. The infrastructure may support such implementations.

FIG. 1 is a diagram illustrating an example system providing a cloud platform analytics, according to the various embodiments. As shown in FIG. 1, an example system 100 may include one or more cloud servers 130, one or more client devices 120 (120a, 120b, 120c), connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, DAMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Cloud server 130 may be any type of entity that provides any type of data and/or services to end users via client devices 120a-c. In the examples provided herein, cloud server 130 may provide access to data via network 110 to a client device 120a-c where a user of a client device 120a-c may be required to provide log-in credentials in order to access data and/or services provided by cloud server 130. Log-in credentials may include SSO credentials used to access the client device. Log-in credentials may include a username, e-mail address, identification number, account number, social security number, or any form of user identification. Log-in credentials may include a password, PIN number, access code, authorization code, or any form of data required to authenticate a user. Log-in credentials also may include a challenge-response test such as CAPTCHA, SiteKey, security question responses, and/or biometric authorization.

Cloud server 130 and/or client device 120a-c may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The network-enabled computer systems may further include data storage. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Cloud server 130 and/or client device 120a-c may further include, for example, a processor, which may be several processors, a single processor, or a single device having multiple processors. Although depicted as single elements, it should be appreciated that according to one or more embodiments, cloud server 130 and/or client device 120a-c may comprise a plurality of cloud servers 130 and/or client devices 120a-c.

Cloud server may include an input/output interface 132, a validation application 134, a clustering application 136, and access application 138, and/or data storage 140. As used herein, the term "application" may be understood to refer to computer executable software, firmware, hardware, or various combinations thereof. It is noted that the applications shown and described herein are intended as examples. The applications may be combined, integrated, separated, or duplicated to support various applications. Also, a function described herein as being performed at a particular application may be performed at one or more other applications and by one or more other devices instead of or in addition to the function performed at the particular application. Further, the application may be implemented across multiple devices or servers or other components local or remote to one another. Additionally, the applications may be moved from one device or server and added to another device or server, or may be included in both devices.

Input/output interface 132 may enable communication between the components of system 100. Input/output interface 132 may include hardware, software, and/or firmware that may enable communication between cloud server 130 and client device 120a-c and/or other components of system 100 using network 110. For example, input/output interface 132 may include an interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data.

Validation application 134 may include hardware and/or software that reads uploaded data and executes specific validation rules against the uploaded data. The specific validation rules may be referred to as a validation checklist associated with uploaded data. A validation checklist may be uploaded with the data from a client device 120 and/or stored on the cloud server and used by the validation application to determine whether uploaded data is valid. Validation rules may include comparing uploaded data to a data type, data size, uploading client identifier, and/or the like. Validation rules may be as simple as dollar amounts of $10,000 or above, or ages above 25, or a range of dates, for example. Validation rules may be flexibly configured. Validation rules may determine, upon comparison, whether the uploaded data is valid according to the validation checklist. If the uploaded data is valid, the validation application 134 may send the uploaded data to another application on the cloud server and/or may store the data in data storage 140. If the uploaded data is invalid, the validation application 134 may generate and transmit a notification to the uploading client device 120 to alert the uploading client device in real-time that the uploaded data is invalid. Accordingly, the uploading client device 120 may reformat, restructure, regenerate, and/or retransmit the data to upload to the cloud server 130.

Cloud server 130 may include a clustering application 136. Clustering application 136 may include hardware and/or software that reads validated data received from the validation application 134 and determines a particular cluster or classification associated with the validated data. Data may be clustered based on data type, data size, data contents, uploading client identifier, and/or the like. In some implementations, the data may be in JavaScript Object Notation (JSON) format and schema may be defined by the user. Such data features may be totally open to the user. Once cluster application 136 assigns the uploaded data to a particular cluster, the data may be stored according to cluster in data storage 140.

Access application 138 may include hardware and/or software that provides access to specific data stored in the cloud server 130. For example, access application 138 may include data to read credentials, such as SSO credentials, in order to provide a client device 120 specific data. Credentials may include a username, e-mail address, identification number, account number, social security number, or any form of user identification. Credentials may include a password, PIN number, access code, authorization code, or any form of data required to authenticate a user. Credentials also may include a challenge-response test such as CAPTCHA, SiteKey, security question responses, and/or biometric authorization.

Cloud server 130 may include data storage 140. Data storage 140, may include for example, random access memory (RAM) and read only memory (ROM), which may be configured to access and store data and information and computer program instructions. Data storage 140 may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored.

Client device 120 may be any type of electronic device and/or component configured to execute one or more processes. In the example embodiments disclosed herein, client device 120 may include, for example, one or more mobile devices, such as, for example, personal digital assistants (PDA), tablet computers and/or electronic readers (e.g., iPad, Kindle Fire, Playbook, Touchpad, etc.), telephony devices, smartphones, cameras, music playing devices (e.g., iPod, etc.), televisions, set-top-box devices, and the like. It is anticipated, however, that the disclosed systems and methods may be used, for example, in connection with other types of client devices 120, such as, for example, clients computers, desktop computers, laptop computers, network computers, workstations, personal digital assistants (PDA), tablet PCs, printers, copiers, scanners, projectors, home entertainment systems, audio/visual systems, home security devices, intercoms, appliances, and the like, or any component or sub-component of another client device 120 or assemblage, such as, for example, a car, a train, a plane, a boat, and the like. Although not illustrated, client devices 120 also may include servers and/or databases. Client devices 120 may be configured to transmit and/or receive information to and/or from other client devices 120 and/or cloud server 130 either directly and/or indirectly via any combination of wired and/or wireless communication systems, method, and devices, including, for example, network 110.

Client device 120 may include at least one central processing unit (CPU), which may be configured to execute computer program instructions to perform various processes and methods. Client device 120 may include an input/output interface 122 which may include for example, I/O devices, which may be configured to provide input and/or output to client device 120 (e.g., keyboard, mouse, display, speakers, printers, modems, network cards, etc.). Input/output interface 122 also may include antennas, network interfaces that may provide or enable wireless and/or wire line digital and/or analog interface to one or more networks, such as network 110, over one or more network connections. Input/output interface 122 may include an output device, such as a printer, display screen (e.g., monitor, television, and the like), speakers, projector, and the like.

Client device 120 may include, for example, a processor 124, which may be several processors, a single processor, or a single device having multiple processors. Client device 120 may include data storage 126. Data storage 126, may include for example, random access memory (RAM) and read only memory (ROM), which may be configured to access and store data and information and computer program instructions. Data storage 126 may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored.

Although not shown, each client device 120 may include one or more encoders and/or decoders, one or more interleavers, one or more circular buffers, one or more multiplexers and/or de-multiplexers, one or more permuters and/or or depermuters, one or more encryption and/or decryption units, one or more modulation and/or demodulation units, one or more arithmetic logic units and/or their constituent parts, and the like. These mechanisms and/or devices may include any combination of hardware and/or software components and may be included, in whole or in part, in any of the components shown in FIG. 2.

Figure 2:
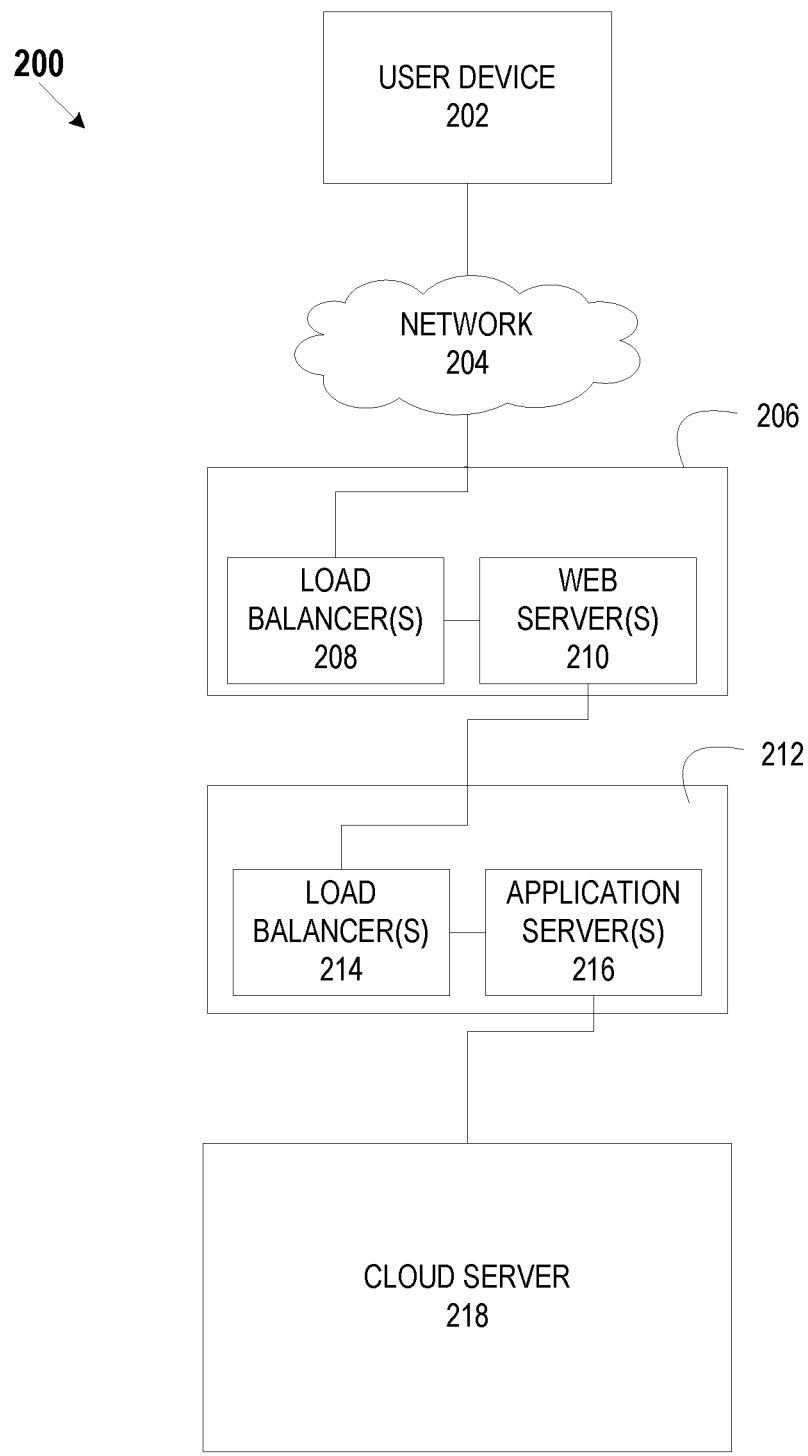
FIG. 2 is a diagram illustrating an example cloud-based analytics platform, consistent with various embodiments.

In one or more designs of cloud server 130 and/or client device 120 of FIG. 1 and cloud server 218 and/or client device 202 of FIG. 2, the functions described may be implemented in hardware, software, firmware, or any combination thereof. If implemented in software, the functions may be stored as one or more instructions or code on computer-readable medium, including the computer-readable medium described above (e.g., RAM, ROM, storage media, and the like.).

Although FIG. 1 depicts cloud server 130 and client device 120a-c communicating with one another using an indirect network connection, such as a connection through network 110, those skilled in the art may appreciate that cloud server 130 and client device 120a-c may communicate with one another and similar devices using a direct communications link or a communications link separate from network 110. For example, cloud server 130 and client device 120a-c may communicate with one another via point-to-point connections (e.g., Bluetooth connections, etc.), peer-to-peer connections, and the like. By way of example, cloud server 130 and client device 120a-c may communicate with one another via mobile contactless communication and/data transfers, remote electronic communication and/data transfers, magnetic stripe communication and/data transfers, secure chip technology communication and/data transfers, person-to-person communication and/data transfers, and the like. Additionally, cloud server 130 and client device 120a-c may communicate with one another utilizing standardized transmission protocols, for example and not by way of limitation, ISO/IEC 14443 A/B, ISO/IEC 18092, MiFare, FeliCa, tag/smartcard emulation, and the like. Also cloud server 130 and client device 120a-c may communicate with one another utilizing transmission protocols and methods that are developed in the future using other frequencies or modes of transmission. Cloud server 130 and client device 120a-c may communicate with one another via existing communication and/or data transfer techniques, such as, for example RFID. Also, cloud server 130 and client device 120a-c may communicate with one another via new and evolving communication and/data transfer standards including internet-based transmission triggered by near-field communications (NFC).

In the embodiment of FIG. 1, cloud server 130 and client device 120a-c may communicate using standard Internet Protocols, such as HTTP, transmission control protocol (TCP), internet protocol (IP), etc. For example, HTTP requests from client devices 120 may be encapsulated in TCP segments, IP datagrams, and Ethernet frames and transmitted to cloud server 130. Third parties, for example, may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications among and between from client devices 120 and cloud server 130.

FIG. 2 depicts an example system 200 that may enable various entities to upload and download data from a cloud server. As shown in FIG. 2, system 200 may include a client device 202, a network 204, a front-end controlled domain 206, a back-end controlled domain 212, and a cloud server 218. Front-end controlled domain 206 may include one or more load balancers 208 and one or more web servers 210. Back-end controlled domain 212 may include one or more load balancers 214 and one or more application servers 216.

Client device 202 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications. In various example embodiments, client device 202 may be similar to client device 120.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks. In various example embodiments, network 204 may be similar to network 110.

Front-end controlled domain 206 may be implemented to provide security for back-end controlled domain 212. Load balancer(s) 208 may distribute workloads across multiple computing resources, such as, for example computers, a computer cluster, network links, central processing units or disk drives. In various embodiments, load balancer(s) 208 may distribute workloads across, for example, web server(s) 210 and/or cloud server(s) 218. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, client device 202, connect to access various services of a financial institution, for example. Load balancer(s) 208 may forward requests to one of the application servers 216 and/or cloud server(s) 218, which may then reply to load balancer 208. This may allow load balancer(s) 208 to reply to client device 202 without client device 202 ever knowing about the internal separation of functions. It also may prevent client devices from contacting cloud server(s) directly, which may have security benefits by hiding the structure of the internal network and preventing attacks on cloud server(s) 218 or unrelated services running on other ports, for example.

A variety of scheduling algorithms may be used by load balancer(s) 208 to determine which cloud server 218 to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, data reporting, risk analysis, and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on cloud server 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above. Load balancer(s) 214 may also work in collaboration with applications running on cloud server 218 to prepare and transmit messages to client device(s) 202 according to a specific algorithm and/or schedule.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 210 may behaves like an extended virtual machine for running applications, transparently handling connections to databases associated with backend A18 on one side, and, connections to the Web client (e.g., client device 202) on the other.

Cloud server 218 may include hardware and/or software that enables cloud storage, validation, clustering, and other processing of uploaded data for client device(s) 202. For example, Cloud server 218 may include and/or be associated with various databases, including access databases that maintain, for example, client account information (e.g., log-in credentials as discussed throughout the disclosure), uploaded data databases that maintain native files, validated uploaded data, clustered validated data, and/or other processed data.

FIG. 3 is an example method 300 for providing a cloud-based analytics platform. Specifically, FIG. 3 illustrates an example embodiment in which a cloud server, such as cloud server 130, receives uploaded data from an uploading client device, such as client device 120, and validates and processes the uploaded data according to specific validation and processing rules that allow the cloud server to store and transmit the validated and processed data to specific client devices as necessary. Data validation rules could be as simple as a range of dates, for example, between Jan. 1, 2017 and Dec. 31, 2017, with a date format of MM/DD/YYYY. Alternatively or in addition, data validation rules may include one or more criteria, for example, dollar amounts below $10000, or ages between 25 and 65.

The method may begin at block 302. At block 304, a cloud server may receive a data transmission from an uploading client device. An uploading client device may transmit data as received at the client device, as requested by a user of the client device, and/or as scheduled by the client device. Uploaded data may include, for example, risk-related data, business-related data, and/or the like. Uploaded data may include specific validation rules associated with the uploaded data.

At block 306, once the data is uploaded to the cloud server, the data may be validated using a specific set of data validation rules associated with the uploaded data. This specific set of rules may be referred to as a validation checklist associated with the uploaded data. A validation checklist may be received along with the uploaded data from the uploading client device. A validation checklist may be stored at the cloud server and, upon detection of a data type, data header, an uploading device identifier, and/or other elements of the uploaded data, a specific validation checklist may be selected and executed against the uploaded data. For example, the uploaded data may be processed according to a specific rule (e.g., a comparison rule, an if/then rule, a threshold determination rule, a calculation and/or algorithm, and/or the like). Data validation rules could be as simple as a range of dates, for example, between Jan. 1, 2017 and Dec. 31, 2017, with a date format of MM/DD/YYYY. Alternatively or in addition, data validation rules may include one or more criteria, for example, dollar amounts below $10000, or ages between 25 and 65.

If the validation checklist determines that the uploaded data and/or a portion thereof fails a validation rule, the cloud server may generate and transmit a notification to the uploading client device at block 310. A notification may be an alert to the client device that specific data, or a specific upload of data, was unsuccessful due to invalid data. A notification may include details about why the validation rule detected invalid data. A notification may include details of how to comply with the validation rules. A client device may then, in response to the received notification, reformat, regenerate, and/or retransmit the data associated with the invalid upload. Once the data is retransmitted to the cloud server, the data validation rules may be re-executed and this process may continue until valid data is uploaded to the cloud server.

At block 308, if the validation rules determine that the uploaded data is valid, the uploaded data may be processed at the cloud server. Data processing may include extracting, parsing, translating, and/or loading the data. At block 312, the valid uploaded data may be clustered according to data contents and/or features. For example, data may be clustered based on data type, data size, uploading client device, a business practice associated with the data, a date associated with the data, an authentication level associated with the data, and/or the like.

At block 314, the data may then be transmitted to a specific downloading client based on the clusters. For example, a downloading client may request, be scheduled to receive, and/or be available to receive client-specific data. Data may be client specific based on downloading client needs associated with specific reports and analysis that may be executed or required by a downloading client.

The method may end at block 316.

FIG. 4 is an example method 400 for providing a cloud-based analytics platform. Specifically, FIG. 4 illustrates an example embodiment in which a cloud server, such as cloud server 130, receives uploaded data from an uploading client device, such as client device 120, and validates and processes the uploaded data according to specific validation and processing rules that allow the cloud server to store and transmit the validated and processed data to specific client devices as necessary.

The method may begin at block 402. At block 404, a cloud server may receive a data transmission from an uploading client device. An uploading client device may transmit data as received at the client device, as requested by a user of the client device, and/or as scheduled by the client device. Uploaded data may include, for example, risk-related data, business-related data, and/or the like. Uploaded data may include specific validation rules associated with the uploaded data.

At block 406, once the data is uploaded to the cloud server, the data may be validated using a specific set of data validation rules associated with the uploaded data. This specific set of rules may be referred to as a validation checklist associated with the uploaded data. A validation checklist may be received along with the uploaded data from the uploading client device. A validation checklist may be stored at the cloud server and, upon detection of a data type, data header, an uploading device identifier, and/or other elements of the uploaded data, a specific validation checklist may be selected and executed against the uploaded data. For example, the uploaded data may be processed according to a specific rule (e.g., a comparison rule, an if/then rule, a threshold determination rule, a calculation and/or algorithm, and/or the like). Data validation rules could be as simple as a range of dates, for example, between Jan. 1, 2017 and Dec. 31, 2017, with a date format of MM/DD/YYYY. Alternatively or in addition, data validation rules may include one or more criteria, for example, dollar amounts below $10000, or ages between 25 and 65.

If the validation checklist determines that the uploaded data and/or a portion thereof fails a validation rule, the cloud server may generate and transmit a notification to the uploading client device at block 410. A notification may be an alert to the client device that specific data, or a specific upload of data, was unsuccessful due to invalid data. A notification may include details about why the validation rule detected invalid data. A notification may include details of how to comply with the validation rules. A client device may then, in response to the received notification, reformat, regenerate, and/or retransmit the data associated with the invalid upload. Once the data is retransmitted to the cloud server, the data validation rules may be re-executed and this process may continue until valid data is uploaded to the cloud server.

At block 408, if the validation rules determine that the uploaded data is valid, the uploaded data may be processed at the cloud server. Data processing may include extracting, parsing, translating, and/or loading the data. At block 412, the valid uploaded data may be clustered according to data contents and/or features. For example, data may be clustered based on data type, data size, uploading client device, a business practice associated with the data, a date associated with the data, an authentication level associated with the data, and/or the like.

At block 414, the data may then be transmitted to a specific downloading client based on received client privileges. Downloading client privileges may include log-in credentials required to access data and/or services provided by a cloud server. Log-in credentials may include SSO credentials used to access the client device. Log-in credentials may include a username, e-mail address, identification number, account number, social security number, or any form of user identification. Log-in credentials may include a password, PIN number, access code, authorization code, or any form of data required to authenticate a user. Log-in credentials also may include a challenge-response test such as CAPTCHA, SiteKey, security question responses, and/or biometric authorization. Once authenticated, a downloading client may request, be scheduled to receive, and/or be available to receive client-specific data. Data may be client specific based on downloading client needs associated with specific reports and analysis that may be executed or required by a downloading client.

The method may end at block 416.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system, comprising:
an uploading client device comprising a first input/output interface, a first processor, and first data storage;
a downloading client device comprising a second input/output interface, a second processor, and second data storage; and
a cloud server, connected to the uploading client device and downloading client device over a network, comprising a validation application, a clustering application, a third input/output interface, and third data storage, wherein the cloud server:
receives, via the third input/output interface, uploaded data from the uploading client device over the network;
validates, using the validation application, the uploaded data against validation rules;
transmits a real-time notification, via the third input/output interface to the uploading client device regarding any invalid data, wherein the uploading client device receives the notification via the first input/output interface of the uploading client device;
categorizes, using the clustering application, the valid data according to specific clustering rules; and
transmits, via the third input/output interface, the categorized data to the downloading client device based on privileges associated with the downloading client device.

2. The system of claim 1, wherein the uploading client device and the downloading client device are the same device.

3. The system of claim 1, wherein the privileges comprise authentication data from the downloading client device.

4. The system of claim 3, wherein the authentication data is single-sign-on authentication data.

5. The system of claim 4, wherein the single-sign-on authentication data comprises at least one of: a user name, an e-mail address, an identification number, an account number, a social security number, a password, a PIN number, an access code, an authorization code, a challenge-response test, or a biometric data.

6. The system of claim 1, wherein the cloud server transmits the categorized data in response to a request for the categorized data from the downloading client device.

7. The system of claim 1, wherein the cloud server transmits the categorized data in response to receiving an input indicating that the downloading client device is able to receive data transmissions.

8. The system of claim 1, wherein the cloud server transmits the categorized data at a scheduled time associated with the downloading client device.

9. The system of claim 1, wherein the real-time notification to the uploading client comprises an alert and instructions to retransmit the invalid data.

10. The system of claim 1, wherein the real-time notification to the uploading client comprises an alert and instructions on how to reformat the data to comply with validation rules.

11. A method comprising:
receiving, at a cloud server via an input/output interface, uploaded data from an uploading client device over a network;
validating, using a validation application on the cloud server, the uploaded data against validation rules;
transmitting a real-time notification, via the input/output interface to the uploading client device regarding any invalid data, wherein the uploading client device receives the notification via an uploading client device input/output interface;
categorizing, using a clustering application on the cloud server, the valid data according to specific clustering rules; and
transmitting, via the input/output interface, the categorized data to a downloading client device based on privileges associated with the downloading client device.

12. The method of claim 11, wherein the uploading client device and the downloading client device are the same device.

13. The method of claim 11, wherein the privileges comprise authentication data from the downloading client device.

14. The method of claim 13, wherein the authentication data is single-sign-on authentication data comprising at least one of: a user name, an e-mail address, an identification number, an account number, a social security number, a password, a PIN number, an access code, an authorization code, a challenge-response test, or a biometric data.

15. The method of claim 11, wherein the cloud server transmits the categorized data in response to a request for the categorized data from the downloading client device.

16. The method of claim 11, wherein the cloud server transmits the categorized data in response to receiving an input indicating that the downloading client device is able to receive data transmissions.

17. The method of claim 11, wherein the cloud server transmits the categorized data at a scheduled time associated with the downloading client device.

18. The method of claim 11, wherein the real-time notification to the uploading client comprises an alert and instructions on how to reformat the data to comply with validation rules.

19. The method of claim 11, wherein the real-time notification to the uploading client comprises an alert and instructions to retransmit the invalid data.

\* \* \* \* \*